US006412955B1

(12) United States Patent
Han (10) Patent No.: US 6,412,955 B1
(45) Date of Patent: Jul. 2, 2002

(54) APPARATUS FOR COMPENSATING ENGINE LOCATION FOR PROJECTION MONITOR

(75) Inventor: Sang-Hyun Han, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 36 days.

(21) Appl. No.: 09/727,512

(22) Filed: Dec. 4, 2000

(30) Foreign Application Priority Data

Feb. 3, 2000 (KR) .......................................... 2000-5413

(51) Int. Cl.[7] .............................................. G03B 21/00
(52) U.S. Cl. ......................... 353/122; 353/74; 353/101
(58) Field of Search ................................ 353/101, 100, 353/72, 74, 76, 77, 78, 122; 248/124.1, 918; 348/745, 806, 827

(56) References Cited

U.S. PATENT DOCUMENTS

| 3,472,588 A | * | 10/1969 | Dine et al. ..................... 353/42 |
| 3,507,571 A | * | 4/1970 | White .......................... 353/78 |
| 5,465,126 A | * | 11/1995 | Fukuda ....................... 353/101 |
| 5,537,169 A | * | 7/1996 | Park ........................... 353/101 |
| 5,741,057 A | * | 4/1998 | Goldberg et al. ............. 353/74 |

* cited by examiner

*Primary Examiner*—William Dowling
(74) *Attorney, Agent, or Firm*—Robert E. Bushnell, Esq.

(57) ABSTRACT

The present invention relates to an apparatus for compensating an engine location for a projection monitor in horizontal and vertical directions, as well as the angle of the engine, so that it is possible to accurately compensate the location of the engine. The apparatus includes a base, a wedge plate fixed on the base, a mounting plate movably fixed on the wedge plate in horizontal and vertical directions and having a circular mounting groove on a center portion of the same, and a stage having a circular support base at a lower portion of the same. The circular support base is rotatably mounted in the circular mounting groove of the mounting plate, an engine is mounted on the stage, and a retainer prevents escape of the circular support base of the stage from the mounting groove while facilitating rotation of the support base and fixing of same at the rotated position. In the present invention, it is possible to easily compensate the location and angle of the engine when they are changed due to external vibration or external force during an assembly operation or transfer of the projection monitor.

15 Claims, 6 Drawing Sheets

APPARATUS FOR COMPENSATING ENGINE LOCATION FOR PROJECTION MONITOR

This application makes reference to, incorporates the same herein, and claims all benefits accruing under 35 U.S.C. §119 from my application APPARATUS FOR COMPENSATING AN ENGINE LOCATION OF A PROJECTION MONITOR filed with the Korean Industrial Property Office on Feb. 3, 2000 and there duly assigned Ser. No. 5413/2000.

BACKGROUND OF THE INVENTION

1. Technical Field

The present invention relates to an apparatus for compensating an engine location for a projection monitor and, in particular, to an apparatus which is capable of compensating the location of the engine for the projection monitor, which projects an image on a screen of the projection monitor in a horizontal and vertical direction, and which is capable of compensating an angle of the engine.

2. Description of the Background Art

Generally, an image display apparatus for projecting optical energy on a screen is classified into a straight view image display apparatus and a projection image display apparatus based on the method for displaying the optical energy on the screen.

The straight view image display apparatus is directed to a cathode ray tube (CRT), called a Braun tube. The CRT has a good display resolution. However, as the size of the screen is increased, the weight and capacity of the same are increased. Therefore, the fabrication cost is increased.

The projection type display apparatus, includes a liquid crystal display (LCD), a DMD, and an AMA.

A projection television or projection monitor is an example of the projection type display apparatus capable of emitting green, red and blue light, and of projecting the emitted color light on a screen through a convex lens and a reflection mirror.

In the projection television or monitor, the location of the engine may be changed due to an external vibration or an external force, and thus the light projected on the screen can become distorted so that a part of the screen is distorted. Therefore, the projection television or monitor should include an engine location compensating unit capable of compensating the location of the engine when the location of the engine is changed.

However, in the conventional engine location compensating unit, it is possible to compensate only left and right direction locations. When the location of the engine is moved in a front and rear direction or in a radial direction, it is impossible to compensate the location of the engine.

SUMMARY OF THE INVENTION

Accordingly, it is an object of the present invention to provide an apparatus for compensating the location of an engine of a projection monitor, and which is capable of compensating the location of an engine in a front and rear direction, of fixing the location of the same in a left and right direction, and of adjusting an installation angle of the engine.

To achieve the above objects, there is provided an apparatus for compensating the location of an engine for a projection monitor which includes: a base; a wedge plate fixed on the base; a mounting plate movably fixed on the wedge plate in a horizontal and vertical direction, and having a circular mounting groove on a center portion of the same; and a stage having a circular support base at a lower portion of the same, wherein the circular support base is rotatably mounted in the mounting groove of the mounting plate, and an engine is mounted on the stage. A retainer is also provided for preventing escape of the support base of the stage from the mounting groove, for implementing a rotation of the same, and for fixing the same at a desired position.

The apparatus for compensating the location of an engine for a projection monitor according to the present invention includes the following features.

In the mounting plate, a horizontal direction elongated hole having a certain horizontal direction length and a vertical direction elongated hole having a certain vertical direction length are formed, and the screw holes are formed in the wedge plate to correspond to the above-described elongated holes. The mounting plate is movably fixed on the wedge plate by an engaging screw which is engaged to each screw hole corresponding to each elongated hole through the horizontal direction elongated hole and the vertical direction elongated hole.

The retainer is ring-shaped and includes a plurality of adjusting holes and a plurality of through holes on the outer surface and upper surface, and it fixes the support base of the stage by means of the adjusting screw engaged through the adjusting hole. The retainer is fixed on the mounting plate by the engaging screw engaged to the screw hole of the mounting plate, and the support base of the stage is fixed on the mounting plate.

The stage includes a horizontal member on the support base, and a vertical member which is upwardly formed at an end of the horizontal member for thereby mounting the engine between the horizontal member and the vertical member.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENTS

The construction of an engine location compensating apparatus for a projection monitor according to the present invention will be explained with reference to the accompanying drawings.

Figure 1:
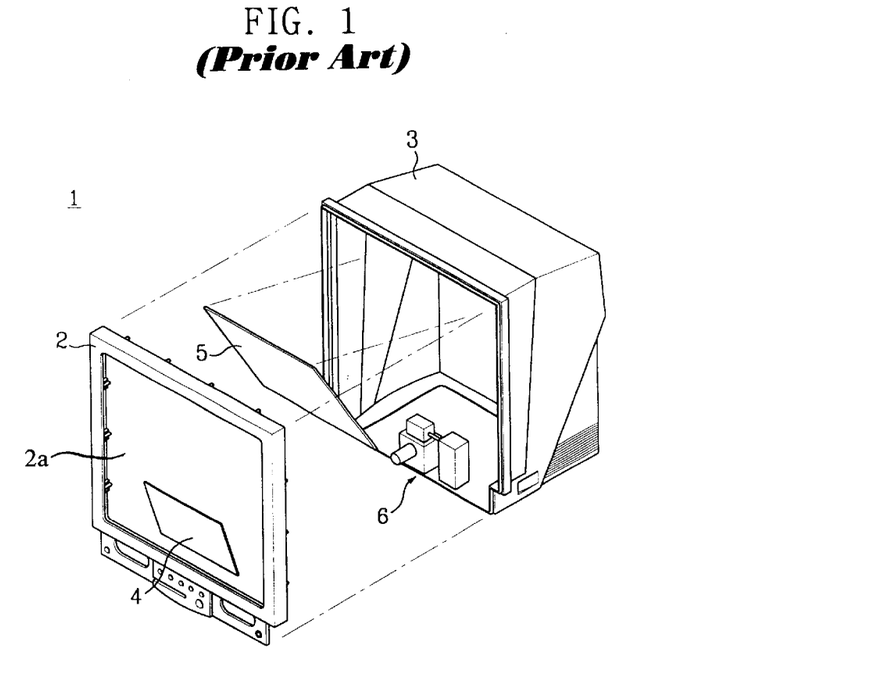
FIG. 1 is an exploded perspective view illustrating a projection monitor having an engine location compensating unit for a projection monitor.

FIG. 1 is an exploded perspective view illustrating the inner structure of a projection monitor.

As shown therein, a projection monitor 1 includes a front casing 2, a rear casing 3 engaged with a rear surface of the front casing 2 to form a sealed space therebetween, an engine 6 for projecting a display image by guiding a light based on an input of an electrical display signal, first and second reflection mirrors 4 and 5, respectively, for guiding the light onto a screen by changing a light axis of a display image projected by the engine 6, and a screen 2a for displaying thereon a display image projected by the engine 6.

The projection monitor 1 described above is capable of projecting a display image projected by the engine 6 on a rear surface of the screen 2a by changing a light axis based on the first and second reflection mirrors 4 and 5, respectively, for thereby displaying, on a front surface of screen 2a, an electrical display signal inputted into the engine 6.

In the projection monitor 1, the location of the engine 6 may be changed due to an external vibration or an external force. If the location of the engine 6 (which is capable of changing an electrical display signal into a display image) is changed, the light projected onto screen 2a may be distorted, so that a part of the display on screen 2a is distorted. Therefore, the projection monitor 1 needs an engine location compensating unit capable of compensating the location of the engine 6 in the case where the location of the engine 6 is changed.

Figure 2:
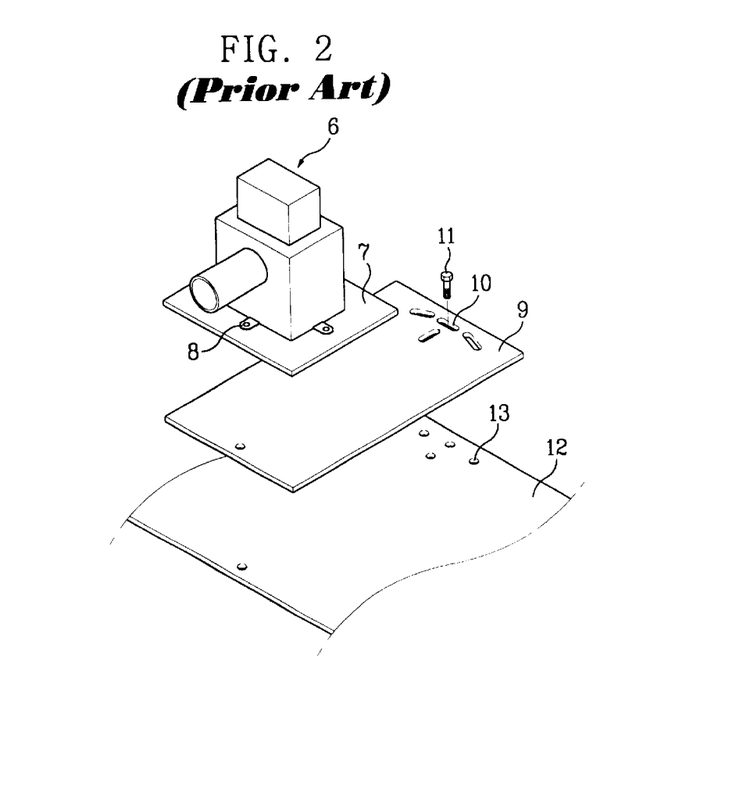
FIG. 2 is an exploded perspective view illustrating an engine location compensating unit for a projection monitor.

FIG. 2 is an enlarged perspective view illustrating an engine location compensating unit.

As shown therein, the engine 6 is integrally fixed on a plate 7 by a fixing bolt 8, and the plate 7 is fixed on a compensating plate 9. The compensating plate 9 includes a plurality of holes 10, each having a certain curved portion at a certain portion thereof. The plate 9 is fixed on a base 12 by an engaging screw 11 engaged to the base 12 through the holes 10.

In the above arrangement, when compensating the location of the engine 6, the engaging screw 11 is loosened, and the compensating plate 9 is released. Next, the engine 6 is rotated in the left and right directions to thereby compensate the location of same, and then the engaging screw 11 is engaged to the base 12 through the holes 10 of the compensating plate 9 to thereby fix the compensating plate 9 to the base 12, so that it is possible to compensate the location of the engine 6.

However, in the above-described engine location compensating unit, it is possible to compensate locations only in the left and right directions. In the case where the location of the engine 6 is moved in a front or rear direction, or in a radial direction, it is impossible to compensate the location of the engine 6.

Figure 3:
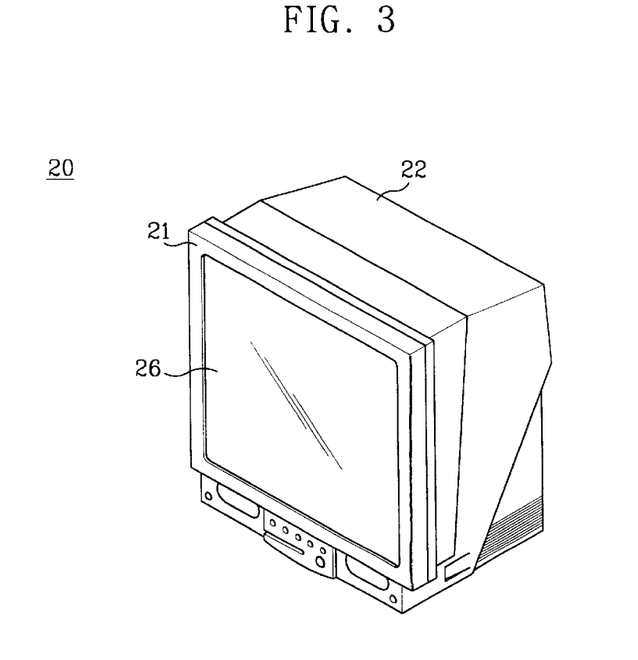
FIG. 3 is a perspective view illustrating a projection monitor having an engine location compensating apparatus for a projection monitor according to the present invention.
Figure 4:
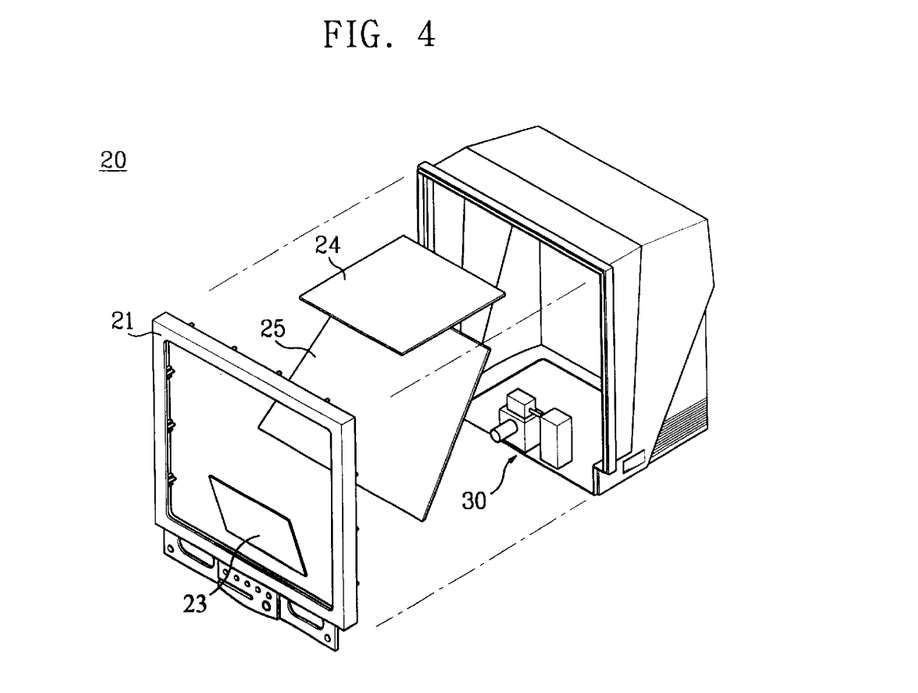
FIG. 4 is an exploded perspective view illustrating a projection monitor having an engine location compensating apparatus for a projection monitor according to the present invention.
Figure 5:
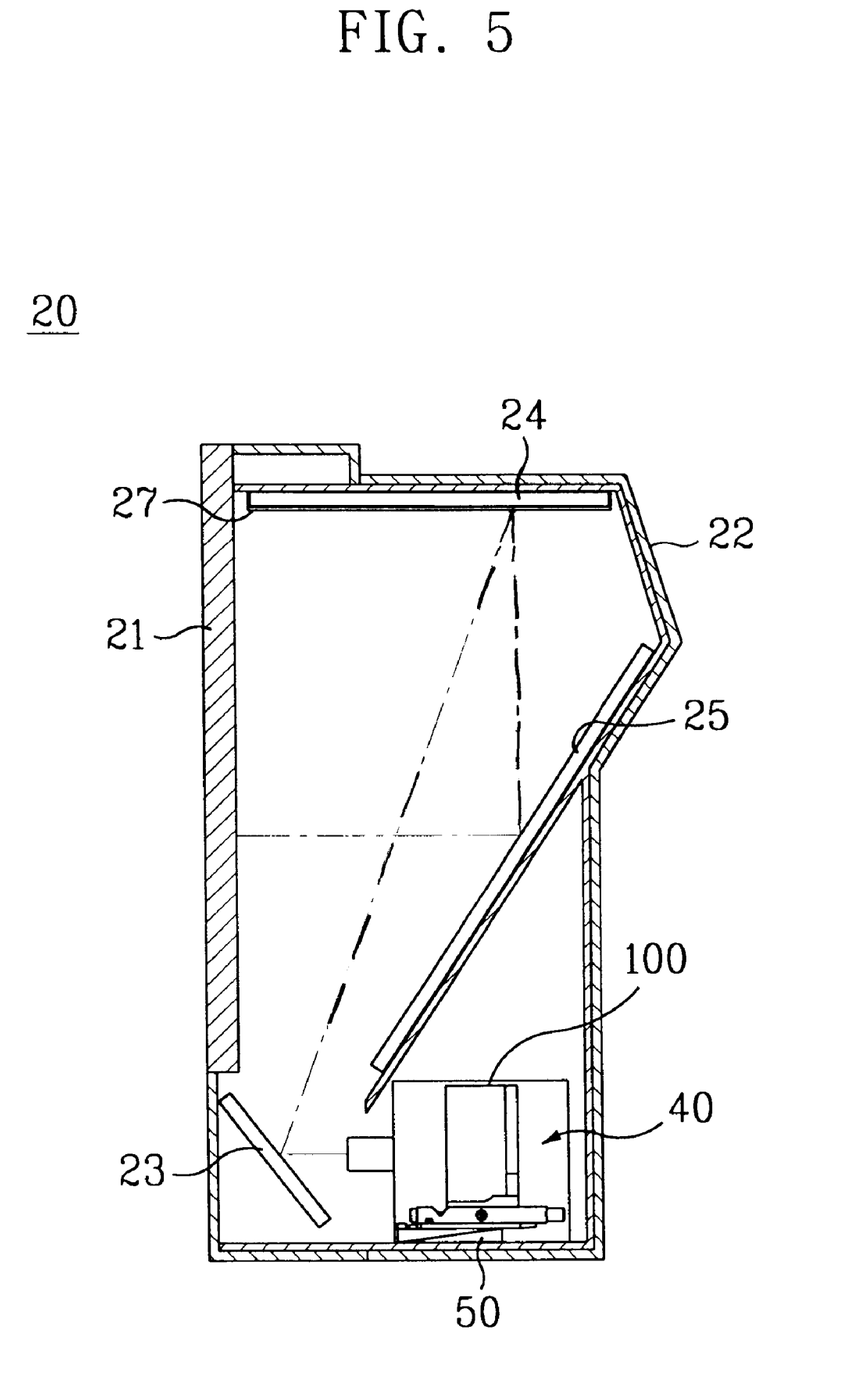
FIG. 5 is a schematic cross-sectional view illustrating an image projection way for a projection monitor having an engine location compensating apparatus for a projection monitor according to the present invention.

FIG. 3 is a perspective view illustrating a projection monitor having an engine location compensating apparatus for a projection monitor according to the present invention, FIG. 4 is an exploded perspective view illustrating an inner structure of a projection monitor having an engine location compensating apparatus for a projection monitor according to the present invention, and FIG. 5 is a schematic cross-sectional view illustrating an image projection way for a projection monitor having an engine location compensating apparatus for a projection monitor according to the present invention.

As shown in FIGS. 3 thru 5, a projection monitor 20 includes a chassis structure formed of a front casing 21 and a rear casing 22 engaged at a rear surface of the front casing 21, an engine unit 30 capable of projecting a display image by controlling an optical ray of light based on an input of an electrical display signal, a screen 26 for implementing a display image projected by the engine unit 30 as a certain image, and first, second and third reflection mirrors 23, 24 and 25, respectively, for guiding a display image projected by the engine unit 30 onto the screen 26 by changing the optical axis of the same.

As shown in FIG. 5, in the projection monitor 20, an engine 100 of the engine unit 30 of FIG. 4 generates a display image when an electrical display signal is inputted to thereby project a display image, and the first, second and third reflection mirrors 23, 24 and 25, respectively, change the optical axis and project on a rear surface of the screen 26 so that an electrical signal inputted into the engine unit 30 is displayed on a front surface of the screen 26.

In the projection monitor 20, the engine unit 30 is capable of generating a display image based on an electrical display signal, and is a component which affects the quality of the display image. Therefore, if the location of the engine 100 of the engine unit 30 is changed by an external vibration or external force, the light projected from the engine unit 100 onto the screen is distorted, so that the image on the screen is also distorted. In the apparatus for compensating an engine location for a projection monitor, in order to prevent a screen distortion phenomenon when the location of the engine 100 is changed, it is possible to compensate the changed location of the engine. In the present invention, as shown in FIG. 5, the engine 100 is fixed on the rear casing 22.

Figure 6:
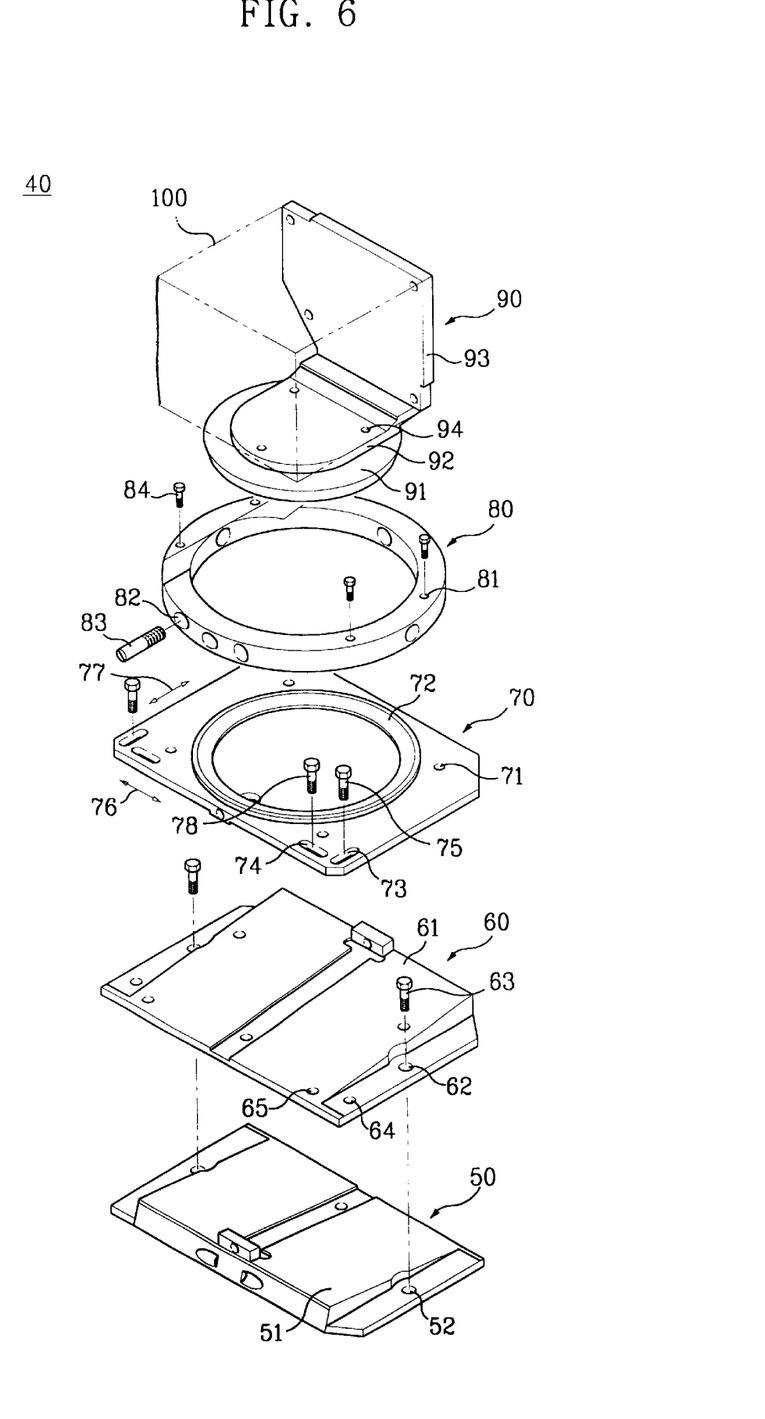
FIG. 6 is an exploded perspective view illustrating an engine location compensating apparatus for a projection monitor according to the present invention.
Figure 7:
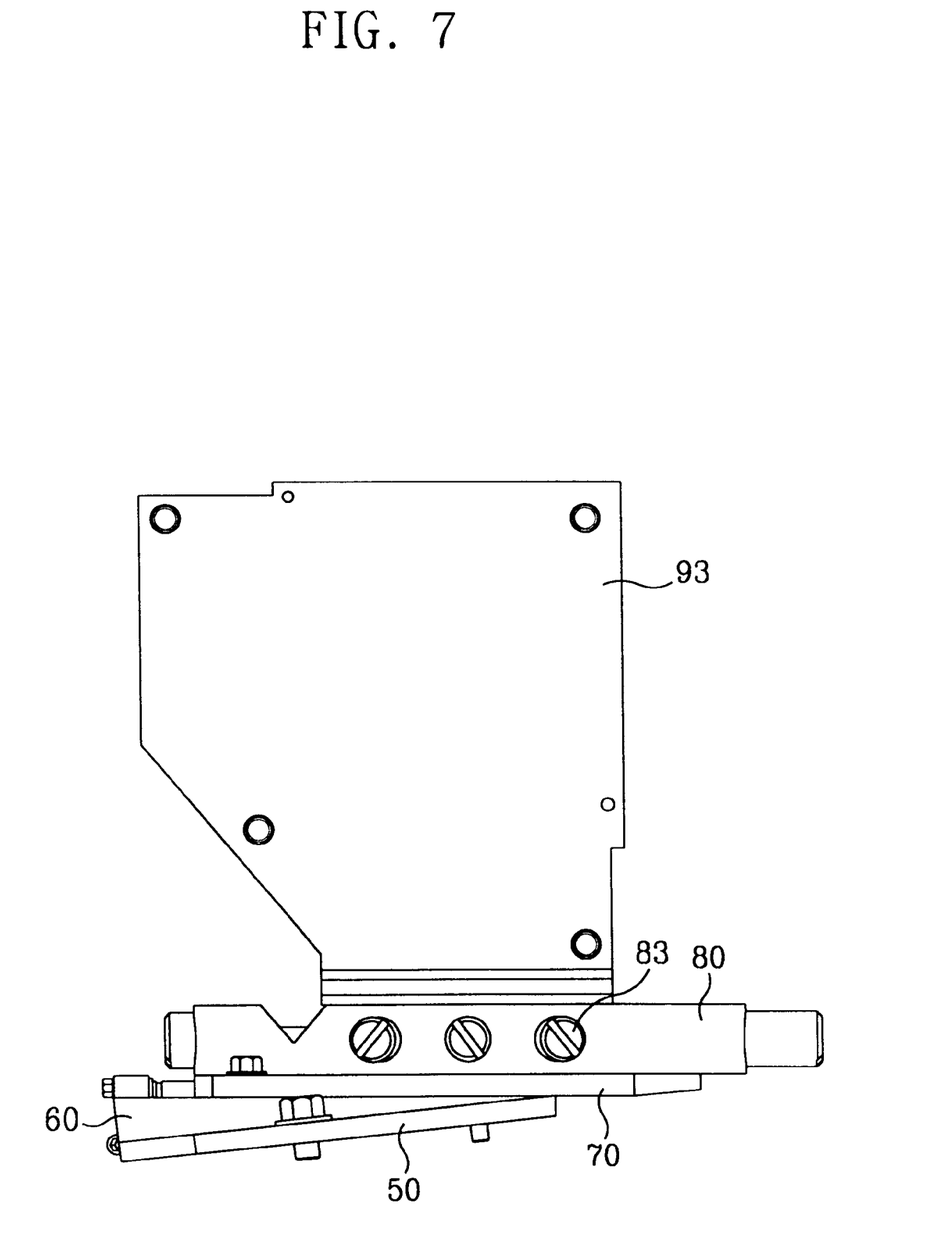
FIG. 7 is a side view illustrating an engine location compensating apparatus for a projection monitor according to the present invention.
Figure 8:
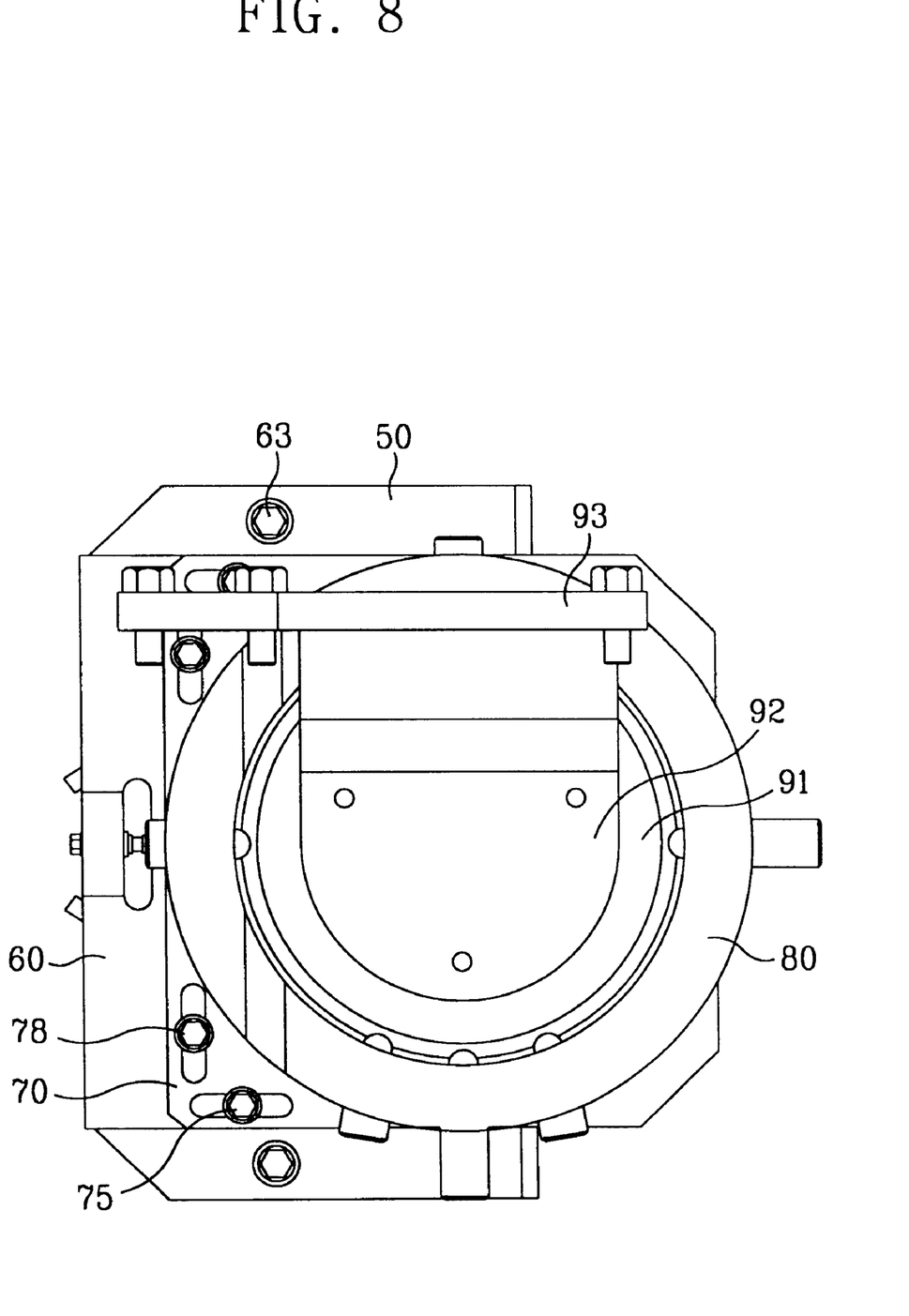
FIG. 8 is a plan view illustrating an engine location compensating apparatus for a projection monitor according to the present invention.

FIG. 6 is an exploded perspective view illustrating an engine location compensating apparatus for a projection monitor according to the present invention, FIG. 7 is a side view illustrating an engine location compensating apparatus for a projection monitor according to the present invention, and FIG. 8 is a plan view illustrating an engine location compensating apparatus for a projection monitor according to the present invention.

As shown therein, the engine location compensating apparatus 40 for the projection monitor 10 includes a base 50 installed at a lower portion of the rear casing 22 and at a certain slanted angle, a wedge plate 60 mounted on and movably engaged with the base 50, a circular mounting plate 70 movably fixed on an upper portion of the wedge plate 60 in front, rear, left and right directions, and having a mounting groove 72 on the upper surface of the same, a retainer 80 rotatably mounted in the mounting groove 72, and a stage 90 which is rotatably fixed on the retainer 80 for mounting the engine 100.

The base 50 is fixed on a lower portion of the rear casing 22, and forms a lower base structure of the engine location compensating apparatus according to the present invention. Base 50 is capable of fixing other components with respect to the rear casing 22, and includes an upper surface which is slanted at a certain angle and a screw hole 52 at both sides of the same.

The wedge plate 60 is fixed on the upper surface of the base 51, includes a screw hole 62 at both sides, and is fixed on base 51 as the engaging screw 63 is engaged with the screw hole formed on the base 50 through the screw hole 62. In addition, the wedge plate 60 fixes the mounting plate 70.

The mounting plate 70 is a square-shaped plate having a circular mounting groove 72 formed on an upper center portion of the same. Mounting plate 70 is movably fixed on the wedge plate 60. Namely, the mounting plate 70 includes a horizontal direction elongated hole 74 at both front corner portions and a vertical direction elongated hole 73. Mounting plate 70 is engaged to screw holes 65 and 64 formed in the wedge plate 60 so that the engaging screws 78 and 75 correspond to the elongated holes 74 and 73, and so that the mounting plate 70 is fixed on the wedge plate 60. In particular, the mounting plate 70 is movable in a horizontal and vertical direction and by a certain distance with respect to the engaging screws 78 and 75 because the elongated holes 74 and 73 have a certain distance with respect to the engaging screws 78 and 75, respectively. Therefore, the mounting plate 70 is moved to a certain position in a horizontal or vertical direction by loosening the engaging screws 78 and 75, and the engaging screws 78 and 75 are tightened to thereby adjust and fix the position of the mounting plate 70. A support base 91 of the stage 90 is mounted in the mounting groove 72 of the mounting plate 70.

The retainer 80 is fixed on the mounting plate 70, enables rotation of the stage 90, and has the shape of a circular ring. The retainer 80 includes a plurality of through holes 81 corresponding to the screw holes 71 formed in the mounting plate 70, and is fixed on the mounting plate 70 by means of the engaging screw 84 engaged to the screw hole 71 of the mounting plate 70 through each through hole 81. In addition, a plurality of adjusting holes 82 are formed along an outer portion of retainer 80. The adjusting screw 83 passes through the adjusting hole 82 and pushes against an outer portion of the support base 91 of the stage 90 inserted into the retainer 80 so that the stage 90 is fixed to a certain position after rotation.

The stage 90 is an L-shaped fixing plate which includes a horizontal member 92, a vertical member 93 vertically extending from a rear end of the horizontal member 92, and a circular support base 91 integral with respect to a lower portion of the horizontal member 92. The engine 100 is mounted between the horizontal member 92 and the vertical member 93. Therefore, the stage 90 fixes the engine 100 in such a manner that the support base 91 is inserted into the retainer 80 and is fixed by the adjusting screw 83.

In the engine location compensating apparatus 40 according to the present invention, the engine 100 is fixed with respect to the rear casing 22, the mounting plate 70 is fixed movably in a horizontal or vertical direction with respect to the wedge plate 60, and the stage 90 is rotated with respect to the retainer 80 and is fixed. Thereafter, the engine 100 is fixed so that the engine 100 is movable in a horizontal and vertical direction, and the rotation angle of the same is adjustable. The compensation of the location of the engine according to the present invention will be explained as follows.

When the engine 100 is installed at a certain deviated position, and the display image of the screen 26 is distorted in a left or right direction, the engaging screw 78 of the horizontal direction elongated hole 74 is loosened, and the mounting plate 70 is moved, and then the engine 100 is positioned at a portion in which the image is displayed on a center portion of the screen 26. Thereafter, the engaging screw 78 is tightened, and then the mounting plate 70 is fixed, so that it is possible to prevent a distortion phenomenon in the left and right directions with respect to the screen 26.

In addition, when the engine 100 is deviated in a front or rear direction, since the focus of the screen is not adjusted, the image is not clear. In this case, the engaging screw 75 in the vertical direction elongated hole 73 is loosened, and the engine 100 is moved in the vertical direction so that the focus of the image on the screen 26 becomes clear. Thereafter, the engaging screw 75 is engaged with and fixed on the portion for thereby implementing a clear image.

In order to compensate the left and right direction angles of the engine 100, the adjusting screw 83 of the outer surface of the retainer 80 is loosened, and the stage 90 is rotated in a circumferential direction, and then the adjusting screw 83 is engaged, and the stage 90 is re-fixed, so that it is possible to compensate the location of the engine by adjusting the left and right direction angles of the engine 100.

As described above, in the apparatus for compensating the location of the engine for a projection monitor according to the present invention, it is possible to adjust the location of the engine in the left and right directions and adjust the angle of the engine, so that it is possible to easily compensate the location or angle of the engine when the location and angle of the engine is changed by an external vibration or external force during an assembling operation or transfer of the system.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. An apparatus for compensating a location of an engine for a projection monitor, said apparatus comprising:

a base;

a wedge plate fixed on the base;

a mounting plate movably fixed on the wedge plate for movement in a horizontal direction and a vertical direction, and having a circular mounting groove on a center portion of the mounting plate;

a stage having a circular support base at a lower portion of the stage, wherein said circular support base is rotatably mounted in the mounting groove of the mounting plate, and an engine is mounted on the stage; and a retainer for preventing an escape of the circular support base of the stage from the mounting groove, for implementing a rotation of the circular support base to a desired position, and for fixing the circular support base at the desired position.

2. The apparatus of claim 1, wherein said mounting plate is movably fixed in the horizontal and vertical directions with respect to the wedge plate by engaging screws engaged to respective screw holes of the wedge plate corresponding to a horizontal direction elongated hole having a certain horizontal direction length and a vertical direction elongated hole having a certain vertical direction length, said horizontal and vertical direction elongated holes being formed on the mounting plate.

3. The apparatus of claim 1, wherein said circular support base is fixed by a plurality of adjusting screws which engage an outer side surface of the retainer, and said retainer is fixed on the mounting plate by an engaging screw which engages the mounting plate in a direction from an upper portion to a lower portion of the retainer.

4. The apparatus of claim 1, wherein said stage includes a horizontal member disposed on the circular support base and a vertical member which is upwardly formed at an end of the horizontal member for mounting the engine between the horizontal member and the vertical member.

5. The apparatus of claim 1, wherein the circular support base is fixed to the desired position by means of screws passing horizontally through holes in sides of the retainer and pressing against sides of the circular support base.

6. An apparatus for compensating a location of an engine for a projection monitor, said apparatus comprising:
   a lower plate;
   a mounting plate fixed on the lower plate and movable in horizontal and vertical directions and having a circular mounting groove located on a center portion of the mounting plate;
   a stage having a circular support base at a lower portion of the stage, said circular support base being rotatably mounted in the circular mounting groove of the mounting plate, and an engine being mounted on the stage; and
   a retainer for preventing an escape of the circular support base from the mounting groove, and including means for preventing rotation of the circular support base in the circular mounting groove so as to fix the circular support base at a desired position.

7. The apparatus of claim 1, further comprising adjustable fixing means on the mounting plate for adjustably fixing the mounting plate on the lower plate so that a position of the mounting plate relative to the lower plate is adjustable in horizontal and vertical directions.

8. The apparatus of claim 7, wherein said adjustable fixing means comprises engaging screws which pass vertically through a horizontal direction elongated hole having a certain horizontal direction elongation and a vertical direction elongated hole having a certain vertical direction elongation so as to engage the lower plate, said horizontal and vertical direction elongated holes being formed in the mounting plate.

9. The apparatus of claim 6, wherein said retainer is fixed on the mounting plate by at least one engaging screw which engages the mounting plate in a direction from above the retainer to below the retainer.

10. The apparatus of claim 6, wherein said stage includes a horizontal member disposed on the circular support base, and a vertical member which is upwardly formed at an end of the horizontal member for mounting the engine between the horizontal member and the vertical member.

11. An apparatus for compensating a location of an engine for a projection monitor, said apparatus comprising
   a lower plate;
   a mounting plate fixed on the lower plate and movable in horizontal and vertical directions, and having a circular mounting groove located on a center portion of the mounting plate;
   a stage having a circular support base at a lower portion of the stage, said circular support base being rotatably mounted in the circular mounting groove of the mounting plate, and an engine being mounted on the stage;
   a retainer for preventing an escape of the circular support base from the mounting groove; and
   adjustable fixing means on the mounting plate for adjustably fixing the mounting plate on the lower plate so that a position of the mounting plate relative to the lower plate is adjustable in horizontal and vertical directions.

12. The apparatus of claim 11, wherein said adjustable fixing means comprises engaging screws which pass vertically through a horizontal direction elongated hole having a certain horizontal direction elongation and a vertical direction elongated hole having a certain vertical direction elongation so as to engage the lower plate, said horizontal and vertical direction elongated holes being formed in the mounting plate.

13. The apparatus of claim 11, wherein said retainer is fixed on the mounting plate by at least one engaging screw which engages the mounting plate in a direction from above the retainer to below the retainer.

14. The apparatus of claim 11, wherein said stage includes a horizontal member disposed on the circular support base, and a vertical member which is upwardly formed at an end of the horizontal member for mounting the engine between the horizontal member and the vertical member.

15. The apparatus of claim 11, wherein said circular support base is fixed by a plurality of adjusting screws which engage an outer side surface of the retainer.

* * * * *